United States Patent [19]

Nagashima

[11] Patent Number: 5,210,467
[45] Date of Patent: May 11, 1993

[54] ILLUMINATION CONTROL CIRCUIT USING A PHOTORECEPTOR BUILT-IN A REMOTE CONTROL DEVICE

[75] Inventor: Akira Nagashima, Saitama, Japan

[73] Assignee: Pioneer Electronic Corporation, Tokyo, Japan

[21] Appl. No.: 862,183

[22] Filed: Apr. 2, 1992

[30] Foreign Application Priority Data

Aug. 30, 1991 [JP] Japan ................. 3-219647

[51] Int. Cl.$^5$ ............................ H05B 37/02
[52] U.S. Cl. ............................ 315/158; 315/77; 307/10.8
[58] Field of Search ........... 315/77, 149, 151, 152, 315/153, 155, 158; 307/10.8

[56] References Cited

U.S. PATENT DOCUMENTS

| 4,368,406 | 1/1983 | Kruzich et al. ........... | 315/158 |
| 4,388,558 | 6/1983 | Mizuno et al. ........... | 315/77 |

OTHER PUBLICATIONS

Molack, Michael A., "Photoresistor provides Automatic Dimming of Electronic Display Systems", *Electronic Design*, 11, May 24, 1976, p. 98.

Primary Examiner—Steven Mottola
Attorney, Agent, or Firm—Sughrue, Mion, Zinn, Macpeak & Seas

[57] ABSTRACT

An illumination control circuit for an on-vehicle apparatus having an optical remote control device. The circuit has a photoreceptor built in the remote control device that receives a light signal for remote control of the on-vehicle apparatus as well as the ambient visible light in a passenger space of the vehicle. The photoreceptor outputs signals corresponding to both the ambient light and the remote control light signal entering the photoreceptor. The output of the photoreceptor is supplied to a low-pass filter that passes a direct current component and frequency components below a predetermined frequency to an illumination controller, which in turn controls the illumination of the on-vehicle apparatus in accordance with the output of the low-pass filter.

4 Claims, 9 Drawing Sheets

FROM LPF

ILLUMINATION CONTROL CIRCUIT USING A PHOTORECEPTOR BUILT-IN A REMOTE CONTROL DEVICE

BACKGROUND OF THE INVENTION

1. Field of the Invention

The present invention relates to an illumination control circuit used in an on-vehicle apparatus such as a car stereo system having an optical remote control feature which enables functions of the stereo system such as loudness control, tuner/CD selection, and FM/AM selection to be carried out by remote control.

2. Related Art

Conventional on-vehicle apparatuses such as car stereo systems are usually provided with illuminated push buttons, switches, and displays for improved operability and improved attractive appearance.

Figure 11:
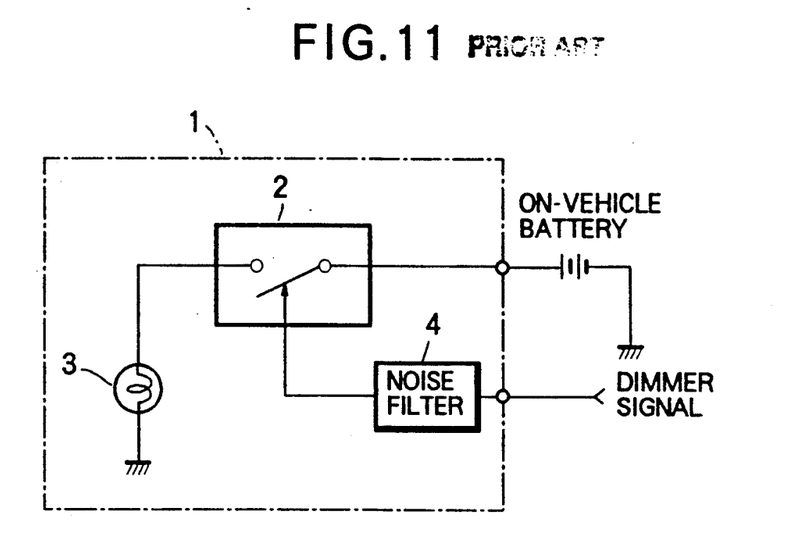
FIG. 11 is a block diagram showing a conventional illumination control circuit.

FIG. 11 shows an illumination control circuit used in conventional car stereo systems. In the figure, a dimmer signal, usually supplied from the vehicle for illuminating an instrument panel of the vehicle, is used as an illumination control signal for the on-vehicle apparatus. The dimmer signal controls an illumination switch 2 of a car stereo system 1 to become on or off so as to effect illumination of the various controls on the panel of the car stereo system 1. With the conventional circuit in FIG. 11, the on and off control of illumination lamp 3 is drivingly effected by the actuation of the illumination of vehicle instruments. Thus, a cord or cable needs to be connected between the dimmer switch of the vehicle and the car stereo system 1. This assembly of the cable requires additional assembly steps. Further, the cable may pick up external noises and therefore a noise filter 4 is needed as shown.

Figure 12:
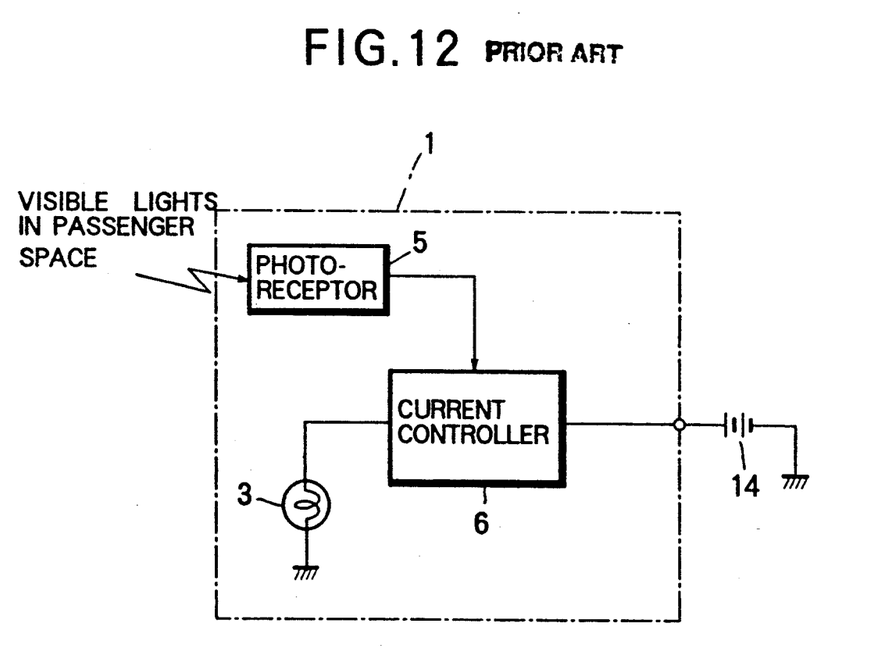
FIG. 12 is a block diagram showing another conventional illumination control circuit.

FIG. 12 shows another example of an illumination control circuit where a built-in photoreceptor 5 is used instead of the dimmer signal in FIG. 11 to control the brightness of illumination lamp 3. The photoreceptor 5 is disposed at an appropriate position on the operating panel of car stereo system 1 so as to detect the visible lights in the passenger space of vehicle. The output of photoreceptor 5 drives a current control section 6 so as to controllably vary the brightness of illumination lamp 3 in accordance with the visible light in the passenger space.

With the conventional circuit in FIG. 12, the photoreceptor 5 must be arranged together with push buttons and switches on the operating panel of car stereo system 1. Miniaturization is of prime importance in on-vehicle apparatuses such as car stereo systems because an available panel area is particularly limited as to space for buttons, etc. The photoreceptor 5 does take up a finite mounting space, placing a limitation on the ability to achieve increased miniaturization of apparatus as well as the resulting in adverse effects in arranging push buttons and switches on the operating panel.

SUMMARY OF THE INVENTION

An object of the invention is to provide an illumination control circuit which does not make use of an illumination control signal or dimmer signal for the instrument panel supplied from the vehicle side. A more specific object of the invention is to provide an illumination control circuit which effects the illumination control operating panel of an on-vehicle apparatus such as a car stereo system in accordance with the ambient brightness while also retaining a space-saving feature of the on-vehicle apparatus.

In the present invention, use is made of a photoreceptor usually used for remote-control purposes. The output of the photoreceptor is used to control the illumination of various controls and switches. No extra photoreceptor is needed exclusively for the illumination purpose as we required in the conventional device mentioned above. This arrangement is therefore space saving.

An illumination control circuit for an on-vehicle apparatus incorporates an optical remote control device that has a built-in photoreceptor for receiving a light signal for performing remote control of functions of the on-vehicle apparatus. The photoreceptor is also made sensitive to background lights or visible lights in a passenger space of the vehicle. The photoreceptor outputs signals corresponding to the lights entering the photoreceptor. The output of photoreceptor is supplied to a low-pass filter that passes a direct current component and frequency components below a predetermined frequency to an illumination controller, which in turn controls illumination of the on-vehicle apparatus in accordance with the output of the low-pass filter.

BRIEF DESCRIPTION OF THE DRAWINGS

Features and other objects of the invention will be more apparent from the description of the preferred embodiment with reference to the accompanying drawings in which.

DESCRIPTION OF THE PREFERRED EMBODIMENTS

Figure 1:
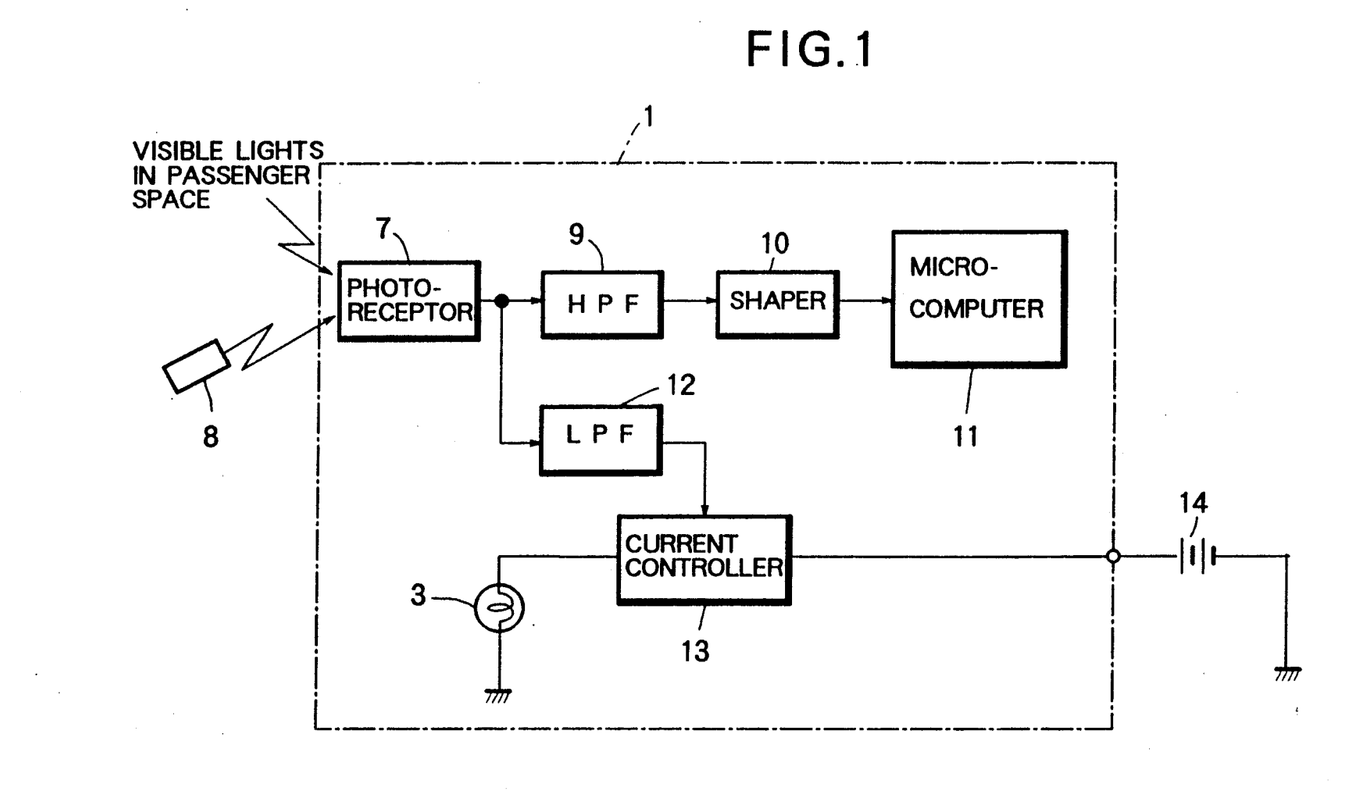
FIG. 1 shows a first embodiment of the present invention.
Figure 2:
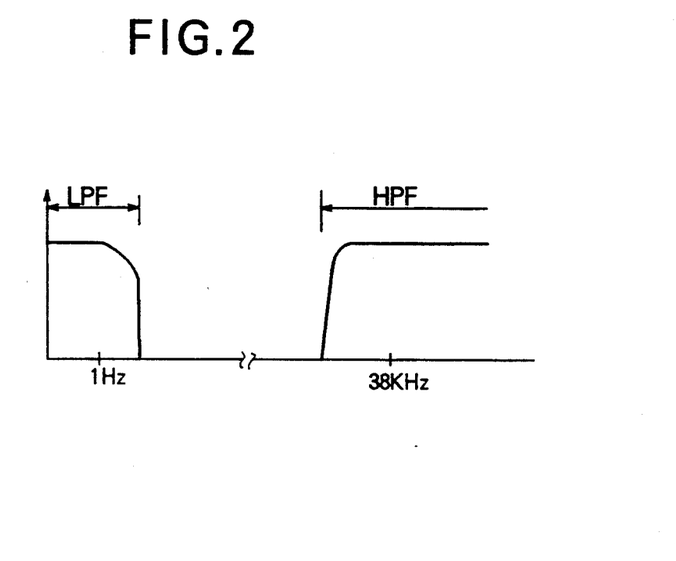
FIG. 2 shows the frequency characteristics of a low-pass filter and a high-pass filter.

FIG. 1 shows a first embodiment of the present invention. An illumination lamp 3 illuminates operating buttons and switches of a remote control type car stereo apparatus 1. A photoreceptor 7 is a photoreceptor intended for a remote-control feature which is usually provided in an on-vehicle apparatus e.g., a car stereo system having a feature of an infrared radiation type remote control. The photoreceptor 7 converts received lights into electrical signals. Since infrared radiation is used for remote control, the photoreceptor 7 is designed to be most sensitive to infrared radiation. The photoreceptor 7 is disposed on the operating panel of the car stereo apparatus 1 so as to properly and efficiently receive an infrared radiation signal from a remote control transmitter 8. Natural light that illuminates the passenger space of the vehicle contains a large number of spectra ranging from infrared region to ultraviolet region that includes visible lights, and therefore the photoreceptor also has a sensitivity to the natural light at all times. A high-pass filter 9 passes signal components corresponding only to a remote control signal transmitted from the remote control transmitter 8. FIG. 2 shows the frequency characteristics of the high-pass filter 9. The output of high-pass filter 9 is directed to a shaper 10 which shapes the remote control signal into square pulses. A microcomputer 11 decodes pulses from the shaper 10 to perform remote control operation of the stereo apparatus 1.

The photoreceptor 7, HPF 9, shaper 10, and microcomputer 11 are the same as those of a well known remote control device. The first embodiment further includes a low-pass filter 12 which passes signal components from dc to a predetermined frequency as low as around one hertz corresponding to external lights to the current control section 13, which in turn controls the brightness of illumination lamp 3. In this manner, a signal portion corresponding only to external lights is extracted.

The operation of the first embodiment will now be described as follows:

The transmitter 8 transmits a remote control signal where pulses of several tens of kilohertz, e.g., 38 kHz, are PCM modulated onto an infrared radiation so that operation commands are transmitted in the form of a digital signal consisting of 1's and 0's. Therefore, the frequency spectrum of infrared radiation for remote control lies in the range of several tens of kilohertz.

When the remote control signal is transmitted from the transmitter 8 to the photoreceptor 7, the photoreceptor 7 receives the signal and supplies the output thereof to both the high-pass filter 9 and the low-pass filter 12. The remote control signal contains high frequency components as shown in FIG. 2, and therefore passes through the high-pass filter 9 to the shaper 10. The shaper 10 shapes the received remote control signal into a non-distorted pulse signal before sending the control signal to the microcomputer 11. The microcomputer 11 decodes the remote control signal in the form of a pulse train so as to perform remote control operations of the car stereo system 1 such as loudness control, selection between tuner and CD, selection between FM and AM, and selection of receiving stations.

It should be noted that the photoreceptor 7 receives not only the light from the transmitter 8 but also the background light or natural light in the passenger space. The natural light slowly varies in intensity over a long time period such as several tens of minutes to several hours in accordance with the movement of the sun. Thus, the frequency components in the output of the photoreceptor 5 corresponding to the natural light lies in the range from dc to very low frequencies(e.g., less than one hertz). The low frequency components as well as dc components are therefore passed through low pass filter 12 to the current control section 13.

Figure 3:
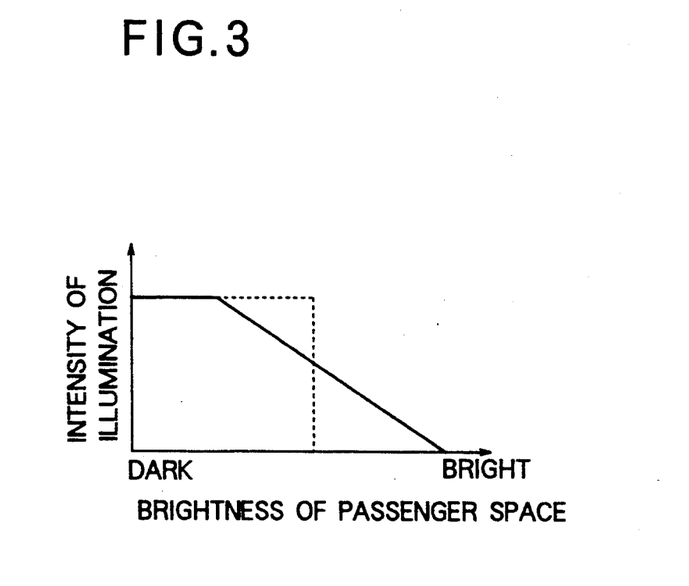
FIG. 3 shows a graph of the intensity of the brightness of the passenger space of a vehicle versus the illumination intensity of the first embodiment.

In accordance with the output of low pass filter 12, the current control section 13 controls the lamp current supplied from a battery 14 of the vehicle to the illumination lamp 3, so that the brightness of illumination lamp 3 increases as the environment grows darker as shown in FIG. 3. The illumination lamp may also be driven stepwise as depicted by a dotted line in FIG. 3 such that the lamp 3 lights up only when the intensity of lights in the passenger space is below a predetermined level.

Figure 4:
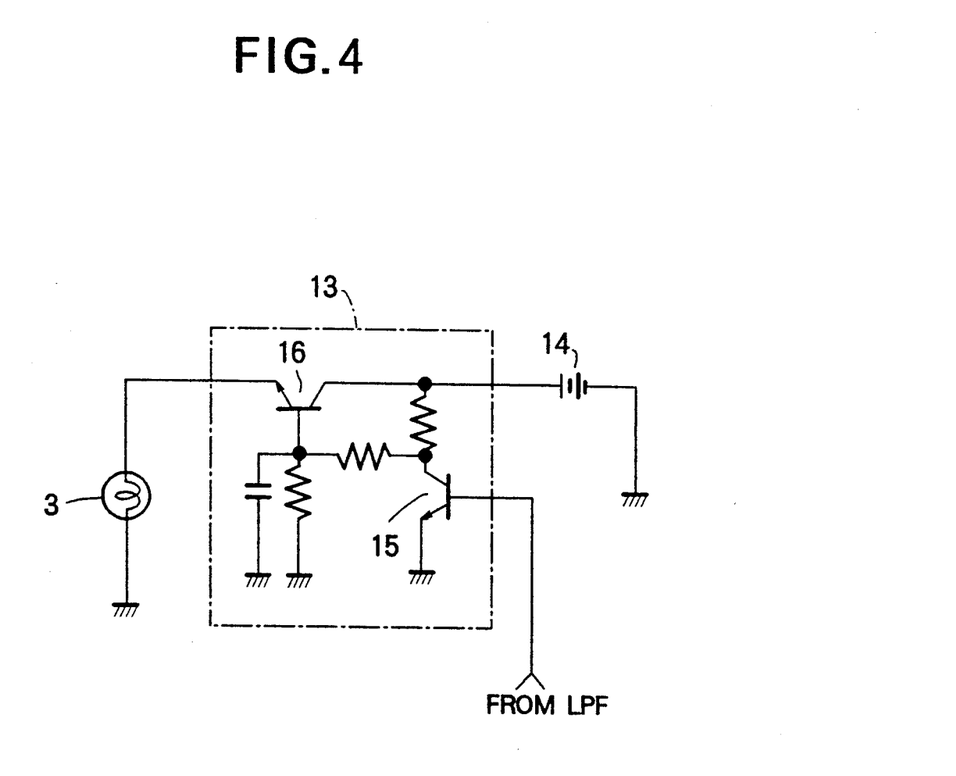
FIG. 4 shows a specific circuit of a current control section of the first embodiment.

FIG. 4 shows a circuit example of the current control section of the first embodiment. In this example, the brightness of illumination lamp 3 is continuously varied. That is, the more intense the lights in passenger space is, e.g., during the day time, the greater the output of the low-pass filter 12 is. When the passenger space is brightest, a transistor 15 goes into complete saturation. This causes the collector of transistor 15 to be almost at zero volt with respect to the ground and the base voltage of a current-controlling transistor 16 to be at nearly zero volt. Consequently, the transistor 16 goes off so that the illumination lamp 3 will not light up.

Meanwhile, the output of low-pass filter 12 decreases as the passenger space grows darker, e.g., in the evening. Then, the collector voltage current of transistor 15 decreases, allowing the collector voltage to become higher. This causes the base voltage of transistor 16 to become higher so that the transistor 16 is conducted. In this manner, the illumination lamp 3 lights up automatically. It should be noted that the current through the illumination lamp 3, i.e., collector current of transistor 16, is inversely proportional to the brightness of the passenger space.

Figure 5:
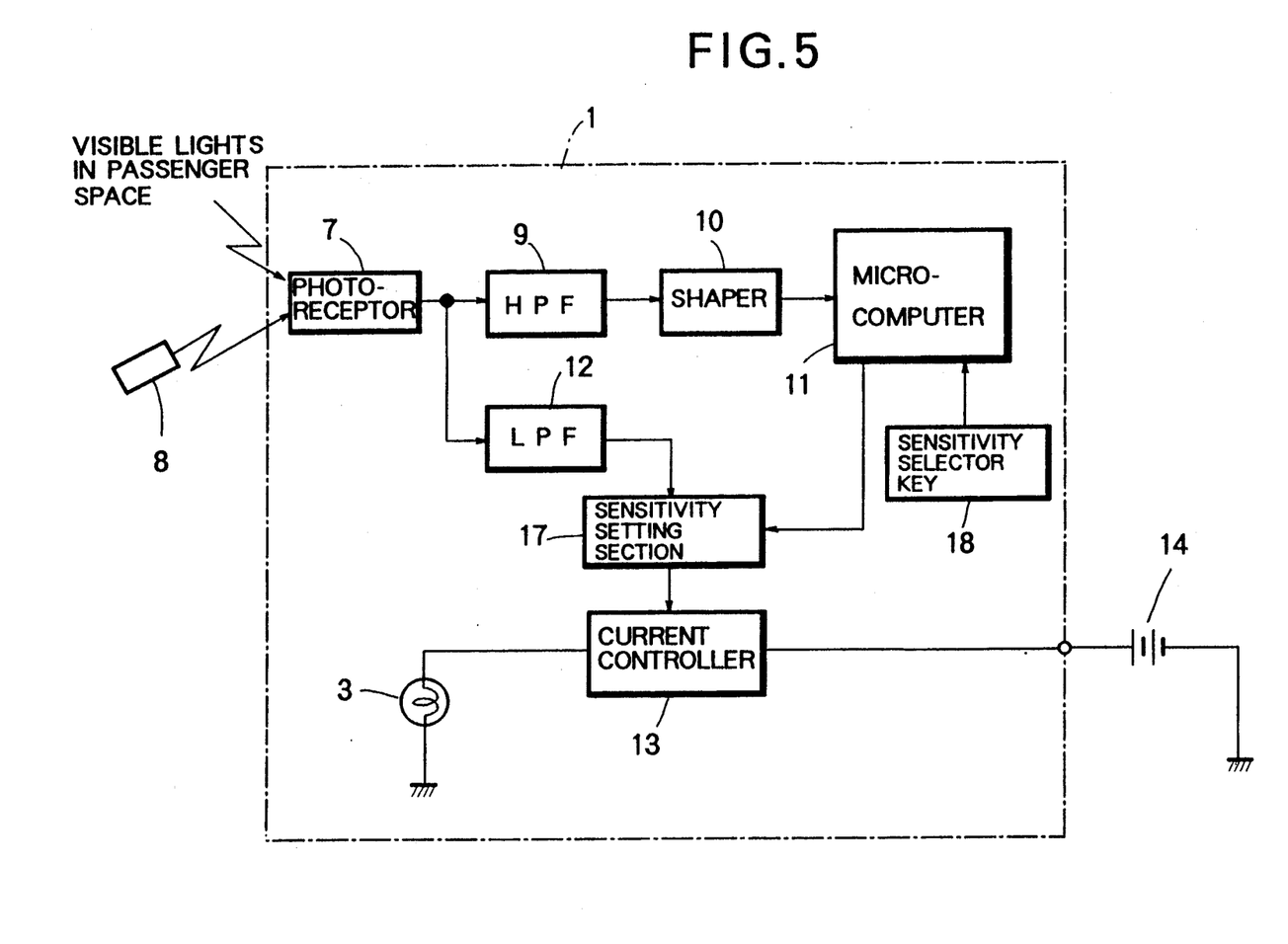
FIG. 5 is a block diagram of a second embodiment of the invention.
Figure 6:
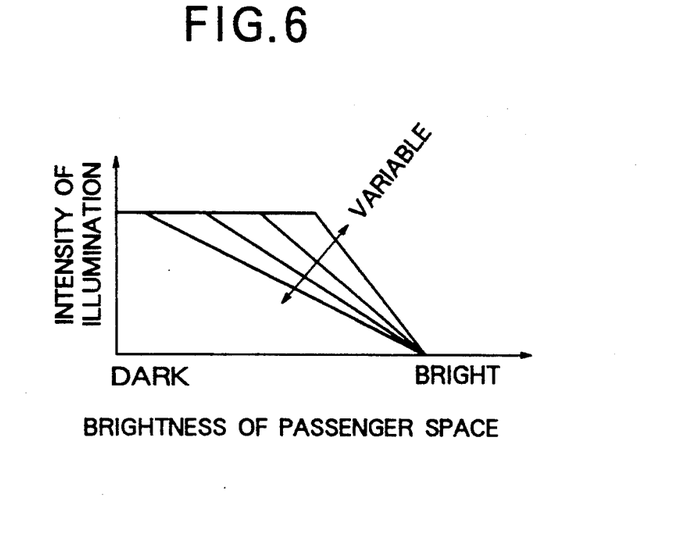
FIG. 6 shows a graph of the intensity of the brightness of the passenger space of a vehicle versus the illumination intensity of the second embodiment.
Figure 7:
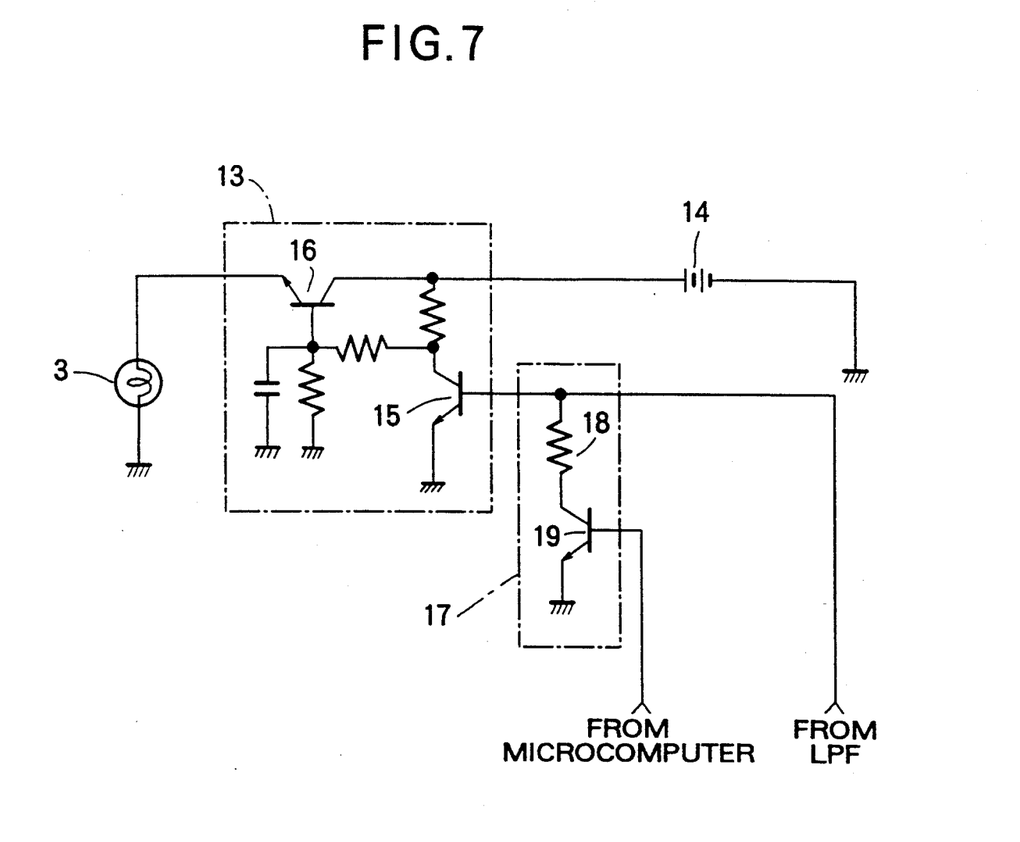
FIG. 7 shows a specific circuit of current control section and a sensitivity selecting section of the second embodiment.

FIG. 5 shows a second embodiment of the invention. In the second embodiment, a sensitivity setting section 17 and a sensitivity selector key 18 are provided in addition to the configuration of the first embodiment in FIG. 1. The slope of the curve responding representing the relationship between the brightness of illumination lamp 3 versus the brightness of passenger space, i.e., sensitivity of the current control section 13 may be varied at will as shown in FIG. 6. FIG. 7 shows a specific circuit configuration of the current control section 13 and the sensitivity setting section 17. The sensitivity setting section 17 is constructed of a transistor 19 and a resistor 28 connected to the base of a transistor 15 of current control section 13. The base current of transistor 19 is controlled by a signal from the microcomputer 11 which causes the collector-to-emitter impedance of transistor 19 to vary, so that the slope of the brightness of illumination lamp 3 can be varies as shown in FIG. 6. The sensitivity selector key 18 is used to specify desired slopes of the graphs in FIG. 6. The sensitivity setting section 17 in FIG. 7 operates to switch between two different sensitivities. A plurality of sensitivities may be switched from one to another by providing a plurality of like circuits which are controlled by signals from a plurality of ports of the microcomputer.

Figure 8:
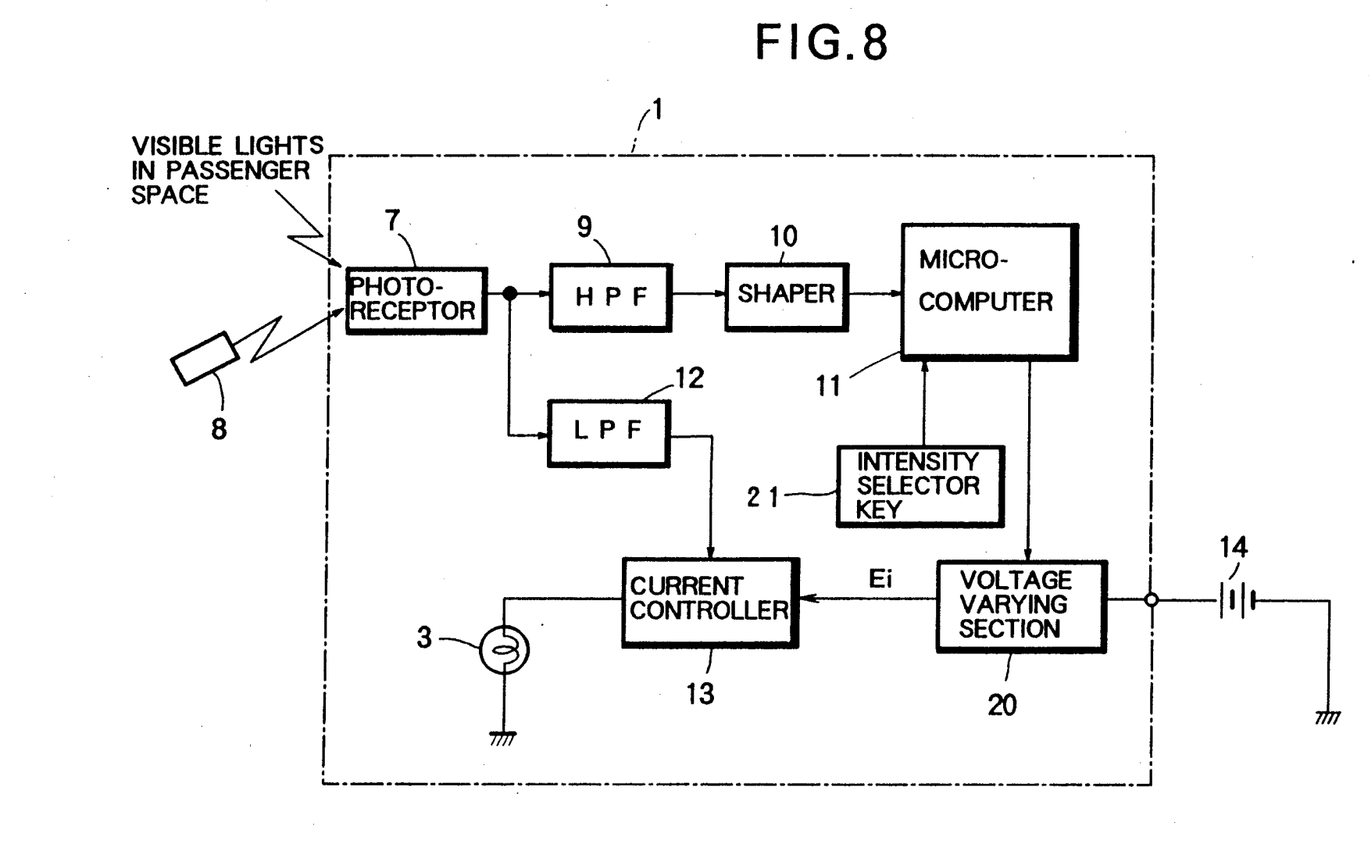
FIG. 8 shows a block diagram of a third embodiment of the present invention.
Figure 9:
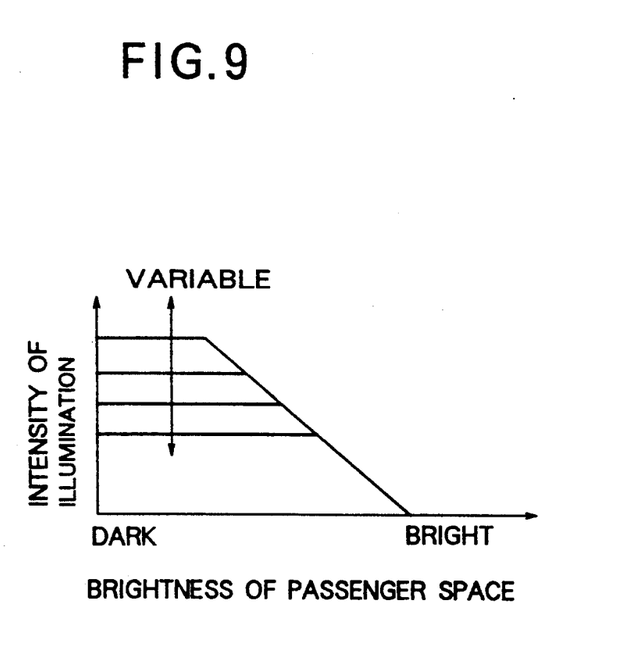
FIG. 9 shows a graph of the intensity of the brightness of the passenger space of a vehicle versus the illumination intensity of the third embodiment.

FIG. 8 shows a third embodiment of the invention. The third embodiment is provided with, in addition to the first embodiment in FIG. 1, a voltage-varying section 20 and an intensity selector key 21. By controllably varying the maximum voltage Ei impressed on the illumination lamp 3, the maximum brightness of illumination lamp 3 may be varied at will as shown in FIG. 9. The intensity selector key 21 is used to specify a desired maximum brightness of the illumination lamp 3.

Figure 10:
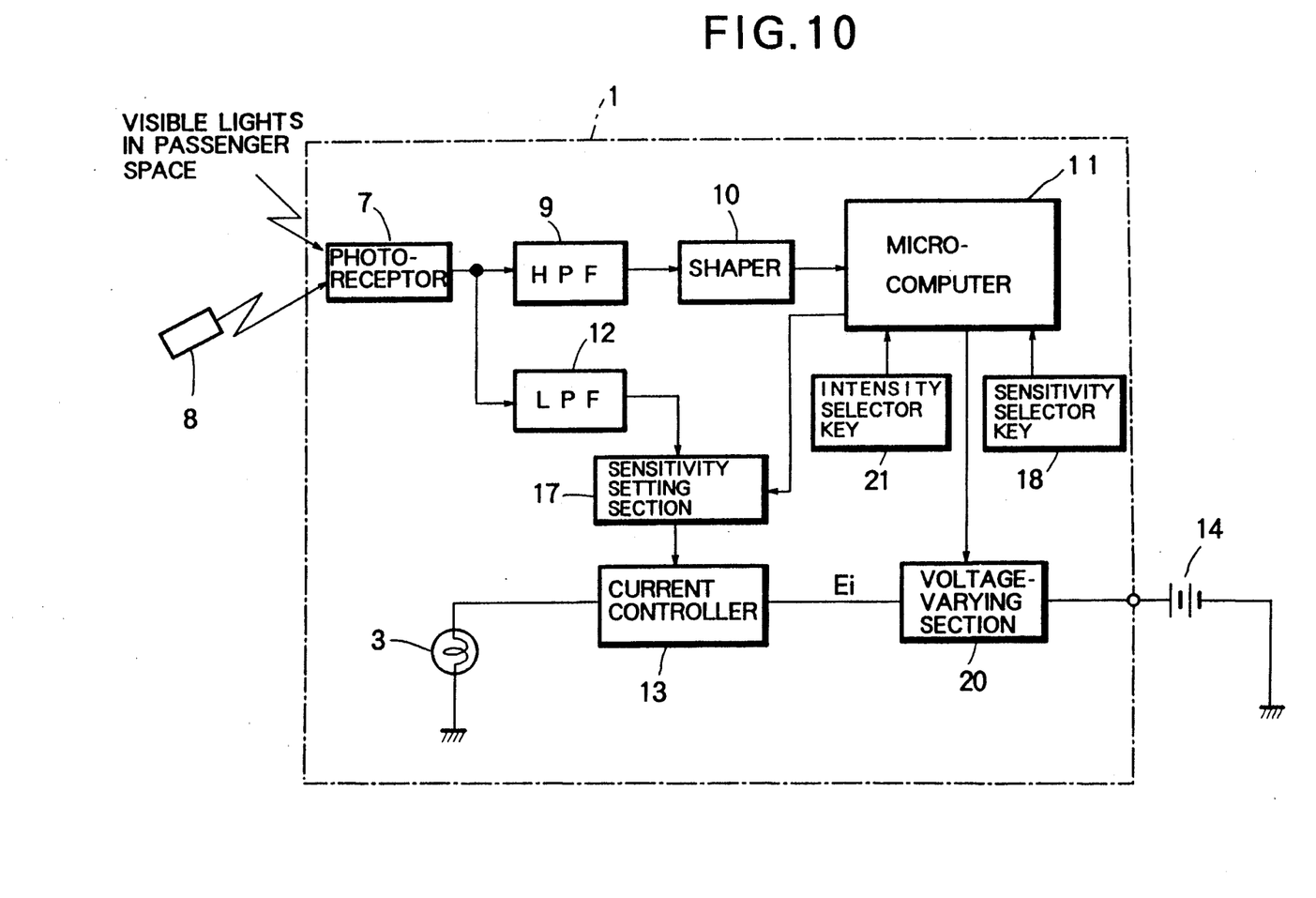
FIG. 10 is a block diagram of a fourth embodiment of the present invention.

FIG. 10 shows a fourth embodiment of the invention. The fourth embodiment has, in addition to the first embodiment, the sensitivity setting section 17 and sensitivity selector key 18 of the second embodiment, and the voltage-varying section 20 of the third embodiment. By this arrangement, both the sensitivity(slope of graph) and the maximum brightness(impressed voltage Ei) of illumination lamp may be varied at will.

All the above embodiments have been described with respect to a construction where the brightness of illumination lamp 3 increases as the passenger space grows darker so that various push buttons and switches on the panel of the on-vehicle apparatus are illuminated in accordance with the darkness of the passenger space. If the illumination lamp 3 takes the form of a backlit displayer such as an LCD(Liquid Crystal Display,) then the brightness of illumination lamp 3 is increased with increasing brightness of passenger space and is decreased with decreasing brightness of passenger space, so that a constant contrast is maintained between the display and the passenger space.

Although the embodiments have been described with respect to an illumination lamp in the form of an incandescent lamp as a light source for illumination, other light sources such as LED's, FL's(Front Luminous Vacuum Fluorescent Display), and EL's(Electroluminescence) may also be used.

What is claimed is:

1. An illumination control circuit for an on-vehicle apparatus having an optical remote control device, comprising:
   a photoreceptor built in the remote control device for receiving a light signal for remote control of the on-vehicle apparatus as well as visible lights in a passenger space of the vehicle, said photoreceptor outputting a remote control signal as well as a background component corresponding to the visible lights in the passenger space;
   a low-pass filter for receiving said background component to output a dc and frequency components below a predetermined frequency; and
   an illumination controller for controlling illumination of said on-vehicle apparatus in accordance with the output of said low pass-filter.

2. An illumination control circuit according to claim 1, wherein said illumination controller includes a sensitivity setting section for variably setting a rate of change in an intensity of illumination of said on-vehicle apparatus for a change in the output of said low-pass filter.

3. An illumination control circuit according to claim 1, wherein said illumination controller includes a maximum brightness setting section for setting a maximum intensity of said illumination.

4. An illumination control circuit according to claim 1, wherein a change of said illumination is effected when the output of said low-pass filter is below a predetermined value.

* * * * *